(12) United States Patent
Mathes et al.

(10) Patent No.: US 7,922,239 B2
(45) Date of Patent: Apr. 12, 2011

(54) MOTOR VEHICLE BODY WITH AN ADAPTER CARRIER FOR A ROOF MODULE, ACCOMPANYING ADAPTER CARRIER, AS WELL AS A METHOD FOR ITS MANUFACTURE

(75) Inventors: Bernhard Mathes, Russelsheim (DE); Bernd Mildeberger, Ingelheim (DE); Richard Stahlhut, Offenbach (DE); Robias Stever, Erzhausen (DE)

(73) Assignee: GM Global Technology Operations LLC, Detroit, MI (US)

( * ) Notice: Subject to any disclaimer, the term of this patent is extended or adjusted under 35 U.S.C. 154(b) by 124 days.

(21) Appl. No.: 12/065,199

(22) PCT Filed: Aug. 25, 2006

(86) PCT No.: PCT/EP2006/008326
§ 371 (c)(1), (2), (4) Date: Feb. 28, 2008

(87) PCT Pub. No.: WO2007/033747
PCT Pub. Date: Mar. 29, 2007

(65) Prior Publication Data
US 2008/0231086 A1 Sep. 25, 2008

(30) Foreign Application Priority Data
Sep. 16, 2005 (DE) .......................... 10 2005 044 283

(51) Int. Cl.
*B62D 25/06* (2006.01)
*B60J 7/00* (2006.01)
(52) U.S. Cl. ..................... 296/210; 296/215; 296/216.01

(58) Field of Classification Search ............. 296/216.01, 296/215, 216.06–216.08, 210
See application file for complete search history.

(56) References Cited

U.S. PATENT DOCUMENTS

| | | | | |
|---|---|---|---|---|
| 3,833,254 A | * | 9/1974 | Renner | 296/210 |
| 4,883,310 A | * | 11/1989 | Miyazaki et al. | 296/210 |
| 5,018,781 A | * | 5/1991 | Kumasaka et al. | 296/210 |
| 5,540,478 A | * | 7/1996 | Schuch | 296/210 |
| 6,340,204 B1 | * | 1/2002 | Seifert | 296/216.07 |
| 6,409,258 B1 | * | 6/2002 | Grimm et al. | 296/216.08 |
| 6,513,865 B1 | * | 2/2003 | Lutz et al. | 296/216.01 |
| 7,775,586 B2 | | 8/2010 | Hallik | |

(Continued)

FOREIGN PATENT DOCUMENTS

DE 3401965 A1 7/1985

(Continued)

OTHER PUBLICATIONS

International Search Report for International Application No. PCT/EP2006/008326, mailed Nov. 23, 2006.

(Continued)

*Primary Examiner* — Dennis H Pedder
(74) *Attorney, Agent, or Firm* — Ingrassia Fisher & Lorenz, P.C.

(57) ABSTRACT

A motor vehicle body is proposed with a roof-carrying frame, upon which an adaptor carrier is placed and secured for holding roof windows, sliding roofs, roof opening systems and/or roof module variants, and an adapter carrier suitable for installation in a motor vehicle body according to the invention. A corresponding method of manufacturing is also proposed for a motor vehicle body with a roof-carrying frame.

7 Claims, 14 Drawing Sheets

U.S. PATENT DOCUMENTS

2002/0167201 A1* 11/2002 Niebuhr et al. ............... 296/213
2005/0029839 A1* 2/2005 Stemmer ..................... 296/215

FOREIGN PATENT DOCUMENTS

| DE | 8816505 U1 | 12/1989 |
| DE | 10155773 A1 | 5/2003 |
| DE | 10163822 A1 | 7/2003 |
| DE | 10228410 A1 | 1/2004 |
| DE | 10249419 A1 | 5/2004 |
| DE | 10355656 A1 | 12/2005 |
| DE | 102005016458 A1 | 10/2006 |
| EP | 1048553 A2 | 11/2000 |
| WO | 2006108569 A1 | 1/2006 |

OTHER PUBLICATIONS

German Patent Office, German Search Report for German Application No. 102005044283.8, Oct. 30, 2007.
International Bureau, PCT Search Report for PCT Application No. PCT/EP2006/008326, Apr. 8, 2008.
USPTO, Non-final Office Action for U.S. Appl. No. 12/944,720, dated Jan. 28, 2011.

* cited by examiner

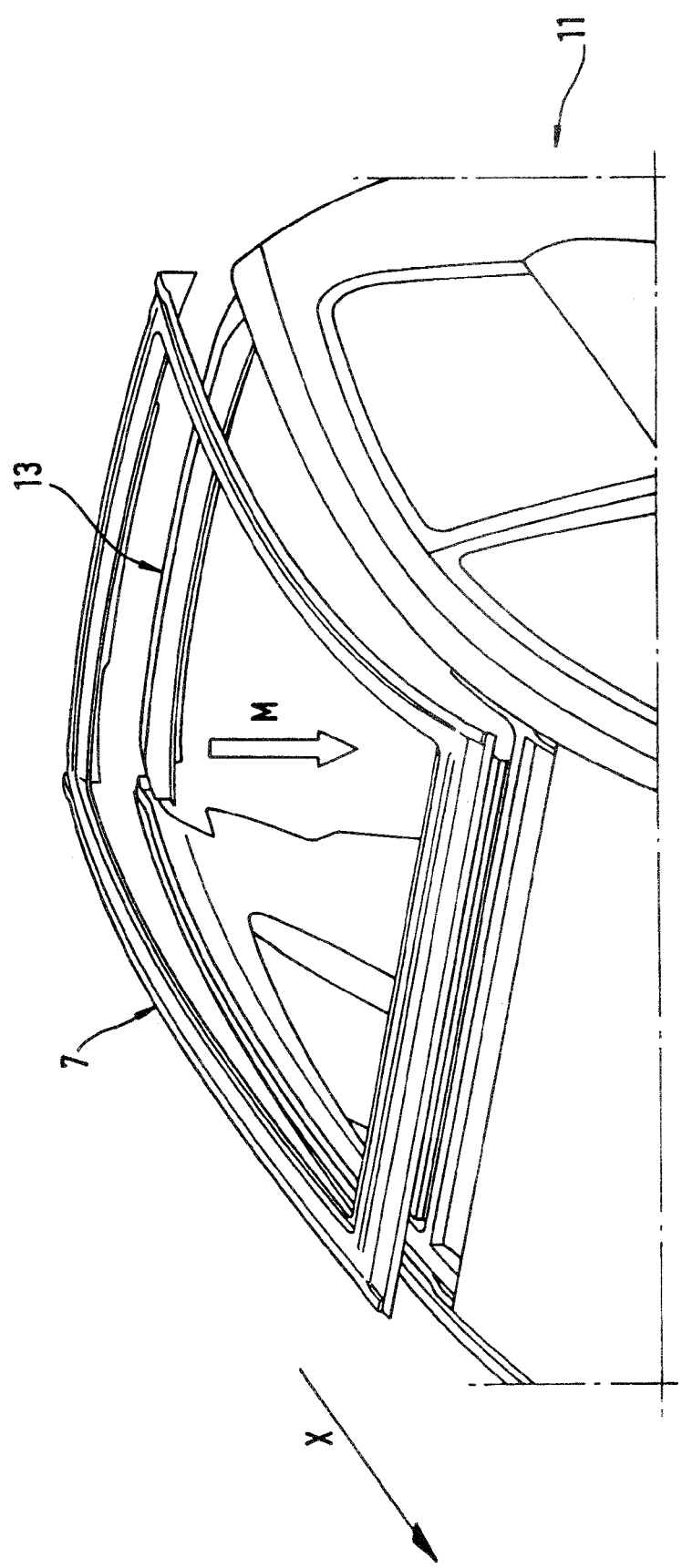

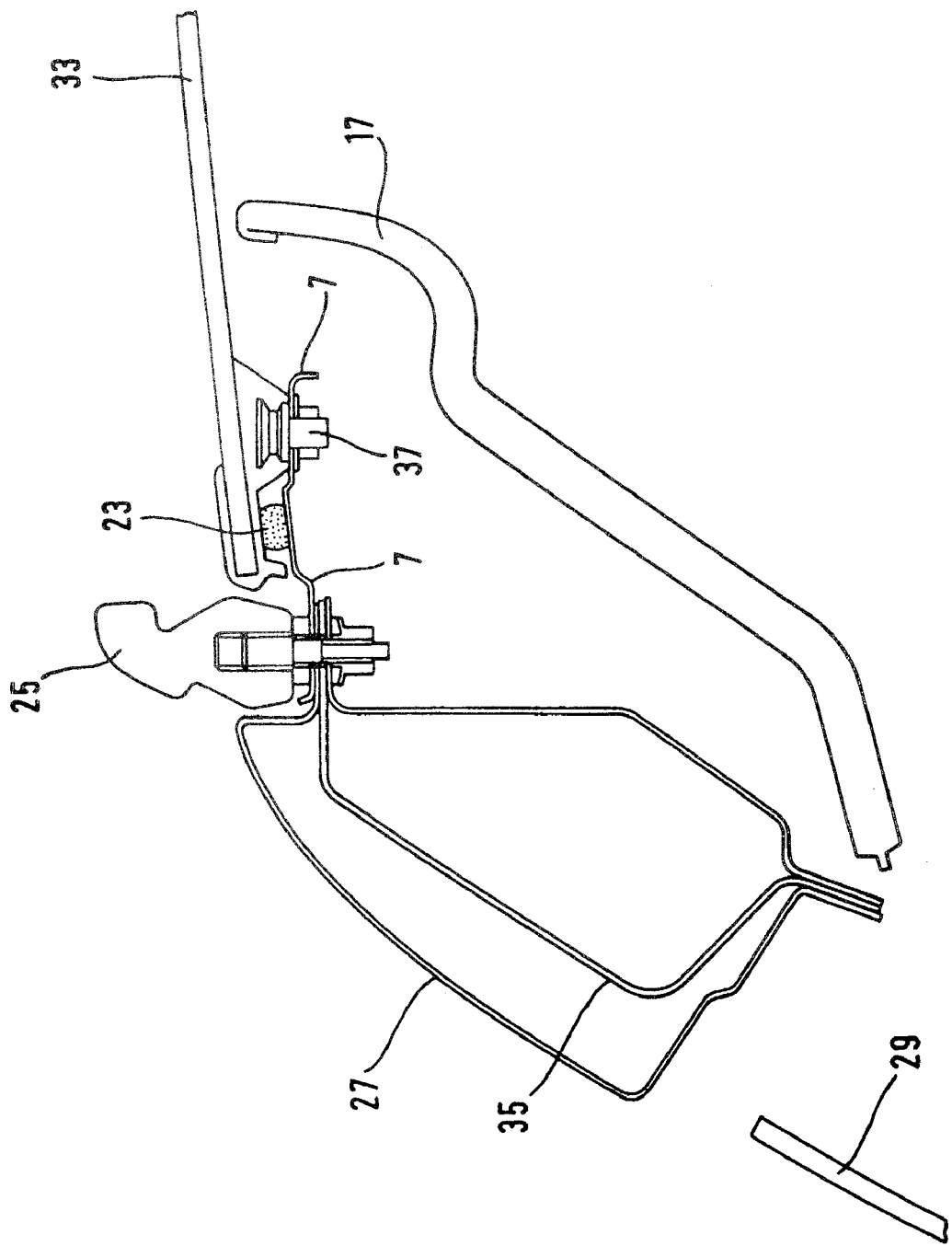

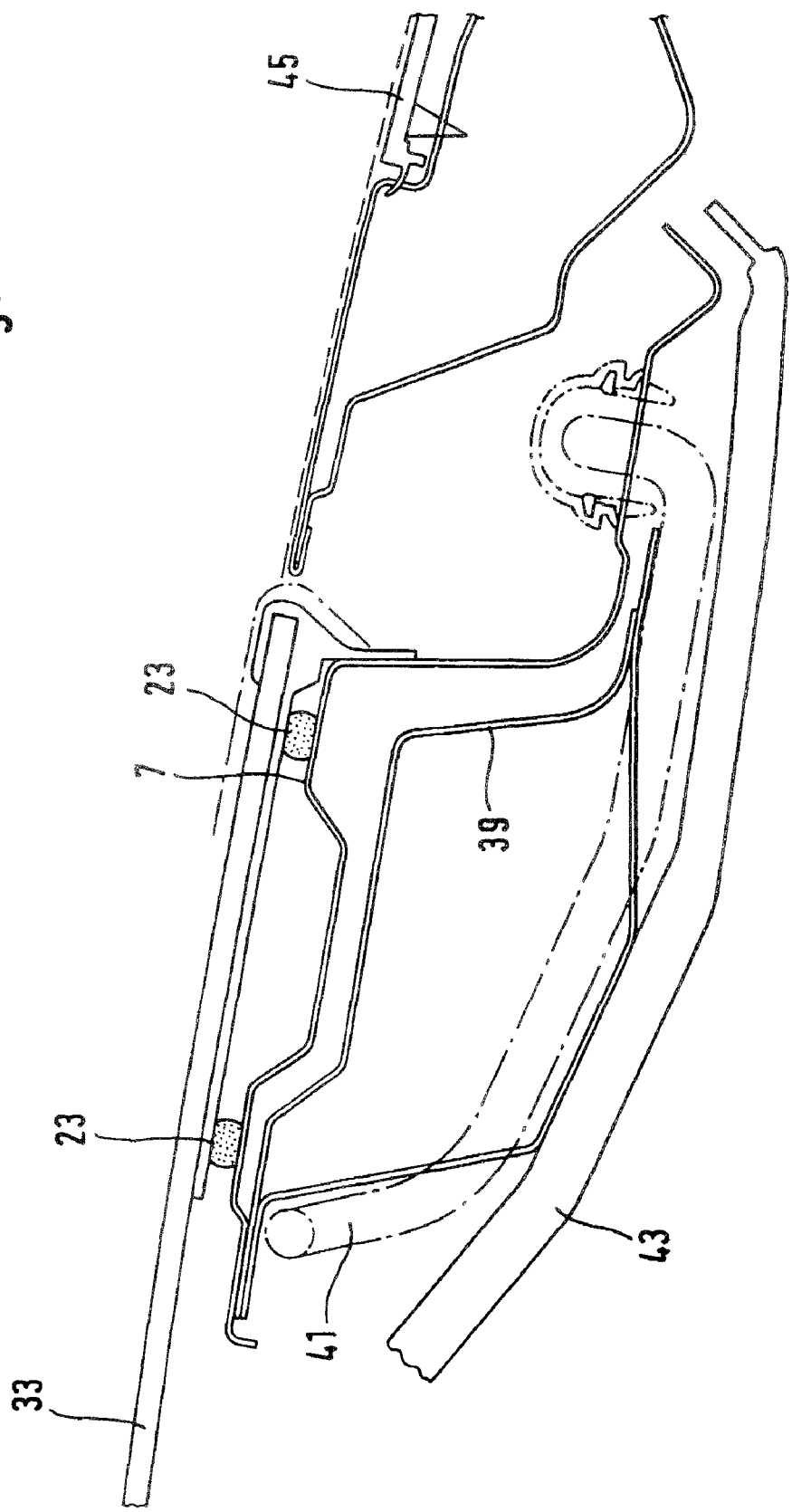

MOTOR VEHICLE BODY WITH AN ADAPTER CARRIER FOR A ROOF MODULE, ACCOMPANYING ADAPTER CARRIER, AS WELL AS A METHOD FOR ITS MANUFACTURE

CROSS-REFERENCE TO RELATED APPLICATIONS

This application is a U.S. National-Stage entry under 35 U.S.C. §371 based on International Application No. PCT/EP2006/008326, filed Aug. 25, 2006, which was published under PCT Article 21(2) and which claims priority to German Application No. DE 10 2005 044 283.8, filed Sep. 16, 2005.

TECHNICAL FIELD

The present invention relates to a motor vehicle body and more particularly to a motor vehicle body with a roof-carrying frame. The invention further relates to a method of manufacturing the motor vehicle body with a roof-carrying frame.

BACKGROUND

Known from practice are motor vehicles equipped with a sliding roof, a sunroof, a lifting roof, a sun/sliding roof or some other roof opening system and/or a roof module variant (in short: roof module). These vehicles differ from conventional standard vehicles in the simple, closed, metal standard roof skin present there. These vehicles with opening roofs share in common that they are manufactured by opening the conventional, closed roof skin and inserting the respectively desired roof module from an already preassembled vehicle, e.g., as discussed in DE 88 16 505 U1. The motor vehicle sliding roof discussed therein exhibits two frames, specifically a welded-in frame and a screwed-in frame. The sliding roof is here secured in the second frame, the screwed-in frame, which is in turn screwed in the central area of the welded-in frame. The first frame, meaning the welded-in frame, which hence incorporates the screwed-in frame including roof module, is welded with the remaining roof skin in a roof opening specially generated for this purpose in the already present roof skin.

However, this mode of installing and attaching the respective roof module to the motor vehicle known in practice has disadvantages when contrasted with contemporary manufacturing aspects of today.

One of the disadvantages lies in the fact that a roof module incorporated after the fact, so to say, as is commonly the case in prior art, diminishes the headroom for the driver and his passengers by comparison to the same vehicle type with conventional, closed vehicle roof owing to the roof module opening- and attachment devices simultaneously required with the module, and associated space requirements.

Another disadvantage is that special and in part expensive and space-consuming structural measures must be taken to seal the roof module relative to the vehicle skin to prevent water, such as rainwater or splashed water, from penetrating inside the vehicle, which is undesired and must absolutely be avoided. However, these measures and their special space requirement can be attributed to a large extent to the fact that incorporating the roof opening system/variant at a later point, meaning after conclusion of final vehicle assembly, constitutes a structural measure taken after the fact, which is performed on the already finished motor vehicle, so that the roof opening system to be installed must be tailored to the specifically encountered structural boundary conditions, with the corresponding outlay.

Another disadvantage to the above-described procedure of subsequently incorporating a roof module in an initially closed, conventional motor vehicle roof lies in the fact that the conventional motor vehicle roof skin that was just opened to insert a roof module generally does not in and of itself exhibit the stability necessary to safely carry the additional weight of the incorporated roof module, complete with all opening, sealing and attachment devices required here.

Rather, the conventional sheet roof loses the required stiffness that had previously been intact, in particular against deformation, as the result of the conversion and installation measures. To remedy this disadvantage, an additional brace for the roof module is often incorporated, again after the fact, which serves to directly or indirectly support the roof module, e.g., on a vehicle column pair. However, this additional bracing is also cost and labor intensive.

It generally holds true with respect to subsequently installed, attached or modified motor vehicle components, and hence also to the roof module incorporated after the fact in the manner discussed above that the subsequent installation is associated with comparatively high adjustment, alteration, manufacturing, labor and time costs, which in the end is viewed as disadvantageous.

As a consequence, the object of the present invention is to avoid the disadvantages of prior art discussed above and propose a motor vehicle body that is characterized by a higher level of design freedom with respect to the roof configuration, and in particular can already be equipped with roof windows, sliding roofs, roof opening systems and/or roof module variants (in short: roof module) cost effectively and without any major additional effort. Another aspect of the invention is to propose an adapter carrier suitable for this purpose. Further, a corresponding manufacturing process is to be specified. In addition, other objects, aspects, desirable features and characteristics will become apparent from the subsequent detailed description and appended claims, taken in conjunction with the accompanying drawings, foregoing background, and subsequent summary.

SUMMARY

This object, and other objects, desirable features, and aspects, is achieved by the motor vehicle body, as well as by an adapter carrier for a motor vehicle body. The object, and other objects, desirable features, and aspects, according to the invention is further achieved by the method of manufacturing a motor vehicle body with an adapter carrier comprising the step of joining a motor vehicle body exhibiting at least two A, B and C columns secured to a roof-carrying frame by means of two structural components extending in the longitudinal direction and two structural components extending in the transverse direction of the motor vehicle with an adapter carrier.

Consequently, a motor vehicle body with at least two pairs of columns (e.g., two A, B and C columns each) are provided, which are interconnected to form a roof-carrying frame by two structural components extending in the longitudinal direction of the motor vehicle as well as two structural components extending in the transverse direction of the motor vehicle, wherein an adapter carrier is placed on the roof-carrying frame and secured thereto. The adapter carrier is used to accommodate roof windows, sliding roofs, roof opening systems and/or roof module variants (in short: roof module).

The motor vehicle body according to an embodiment of the invention is advantageously characterized by the availability of an adapter carrier for roof windows, sliding roofs, roof opening systems and/or roof module variants of sufficient stability for accommodating at least one of the aforementioned modules. As a result, there already exists a device for accommodating a roof module on the motor vehicle body that is factory developed, planned, structurally configured for the special application and provided for this purpose, correspondingly laid out and structurally designed. Depending on the respective vehicle type, the latter can already be subjected to detailed calculations and optimized in advance to reflect the respectively expected structural and mechanical boundary conditions.

This advantageously means that the structural design and configuration of the adapter carrier of the motor vehicle body allows it to accommodate even a heavy roof module, for example a glass pane roof, with sufficient stability, and support it against the motor vehicle body by way or means of the roof-carrying frame to which the adapter carrier is secured. This type of support for the roof module accommodated in the adapter carrier as already taken into account and prepared at the factory during the planning phase permits a support that takes up significantly less overall height by comparison with the method known from prior art, which advantageously yields greater headroom for the driver and his passengers.

Another advantage to the already factory-configured motor vehicle body with an adapter carrier is that the devices for sealing the vehicle interior to prevent wetness, dirt or the like from penetrating at the edge of the roof module can be made more target oriented, problem oriented, and cost effectively, at lower production costs and a reduced time outlay than is the case in the conventional procedure.

In addition, the roof modules used in the adapter carrier of the motor vehicle body are exposed to less stringent mechanical requirements. This stems from the fact that a roof module incorporated in the adapter carrier is subject to less oscillations and deformational or torsional forces while driving the motor vehicle, since its stable attachment to the adapter carrier, which is in turn stably secured to the roof-carrying motor vehicle frame, is exposed to less severe oscillations and deformations than the conventionally attached roof module.

This in turn advantageously results in the roof modules accommodated in the adapter carrier can be integrated into the motor vehicle body in such a way as to further save on overhead clearance, wherein the attachment at the edges can simultaneously be made significantly more narrow and/or space-saving in design, which in the end results in the advantage of taking up considerably less space that might be used for other purposes, and increasing the interior volume of the passenger compartment with respect to the heads of the driver and/or passengers.

The adapter carrier becomes especially easy to mount to the motor vehicle body if the adapter carrier is secured to a bearing flange of the structural components.

The motor vehicle body exhibits a particularly high level of stability if the structural components and adapter carrier together border a hollow chamber.

The motor vehicle body exhibits a particularly high level of stability if the adapter carrier connects several identical columns to each other.

At least one object of the invention is also achieved by means of an adapter carrier suitable for installation in a motor vehicle body as described above. This adapter carrier is a supporting structure which, when used in the manner described above in a motor vehicle body, makes it possible to synergistically achieve all of the aforementioned advantages in full measure.

In a preferred embodiment, the adapter carrier is essentially designed as a frame structure.

Designing the adapter carrier as a frame structure is advantageous in that the frame structure of the adapter carrier gives it an elevated stability and improved stiffness by comparison to an assembled adapter carrier, thereby improving the attachment of the roof module in the roof carrier and/or the vehicle on the one hand, and the safety of the motor vehicle itself in its roof area on the other. In addition, an adapter carrier designed as a frame structure can be used to additionally increase the stiffness of the passenger cabin, and hence improve safety for the passengers.

In another preferred embodiment, the adapter carrier can advantageously be designed as a single section, enabling its manufacture in a comparatively simple, and hence cost effective manner. Further, this embodiment further reduces the number of required components to the minimum required number, thereby reducing the necessary storage, manufacturing and cost outlay. Another advantage to this preferred embodiment is that the omission of potential connections and the attachment means between individual frame sections required for this purpose enables an especially simple, tailor-made, precisely dimensioned and cost-effective production.

The tolerance of the adapter carrier relative to the structural components of the motor vehicle body can be easily balanced in an advantageous further development of the invention if exhibits several edge plates, and if the edge plates exhibit flanges for attachment to the bearing flange. This additionally minimizes scrap during the production of the adapter carrier, since fitting together the edge plates generates an opening in the adapter carrier. In addition, the advantage to fitting together the adapter carrier using individual edge plates is that the adapter carrier is especially easy to handle during assembly. In comparison to the one-piece adapter carrier, the edge plates also exhibit a high stability against surface distortion, and are easy to transport. Therefore, the adapter carrier exhibiting the edge plates is especially inexpensive to manufacture, and easy to transport and assemble.

In another advantageous further embodiment, it helps to further simplify the adapter carrier if the edge plates exhibit a straight, long stretched-out shape, and are each joined with one of the structural components.

Elbows and the like for generating the adapter carrier can be avoided in another advantageous further development of the invention by arranging the edge plates in a frame relative to each other. For example, this makes it possible to put together the adapter carrier provided for accommodating the roof window out of four straight edge plates.

In another preferred embodiment, the adapter carrier is secured to the motor vehicle by means of welding, bonding or pressure joining.

This embodiment is characterized by the method of joining the roof module to be used in the adapter carrier, which is especially simple and associated with little production outlay. In other words, there is no special outlay during vehicle assembly for automating the process of incorporating the adapter carrier in the roof-carrying frame of the motor vehicle, followed by an also automated process of welding or bonding the adapter carrier with the roof-carrying frame. Another advantage to joining the adapter carrier with the motor vehicle has to do with the fact that the adapter carrier can be comparatively easily removed at a later point, for example after damage to the vehicle roof or the like.

Welding can further be performed by means of an automatic welding machine on a production line. This advantageously makes it possible to integrate the necessary steps in the ongoing production process, while realizing a corresponding savings potential.

In addition, welding the adapter carrier to the motor vehicle is associated with all advantages known to the expert from using welding as a joining process, for example temperature expansion of the weld seams relative to the thermal behavior of the welded components and water tightness. However, the embodiments of the invention are not limited to the welded joint discussed above. The adapter carrier can also be bonded to the body, and any other process preferred by the expert is also possible.

Another preferred embodiment of the adapter carrier is characterized in that it exhibits attachment devices for roof windows, sliding roofs, lifting roofs, roof opening systems and/or roof module variants (in short: roof module), which are designed in such a way that the respective roof module incorporated in the adapter carrier can be switched for another roof module.

One advantage to this embodiment is that the purchaser of a motor vehicle need not determine what kind of roof design he would like to have for his motor vehicle for the next several years while he is buying his motor vehicle. Hence, this embodiment advantageously makes it possible to change out a selected roof module for another one without any special outlay. The resultant, previously unknown flexibility makes it possible to foster loyalty among existing customers and attract new customers more easily.

To this end, for example, screwed connections, lever mechanisms or adhesive bonds can be used between the adapter carrier and roof module, which enable replacement without any special assembly or handling outlay.

Therefore, the owner of a motor vehicle equipped with an adapter carrier can replace a simple sunroof with a larger, wide-opening roof opening system, for example, after moving to a sunnier and/or warmer location. Further, suitable, readily detachable attachment means for the roof module in the adapter carrier can be used to seasonally change out roof modules. In this conjunction, for example, it is conceivable to use the open roof module in the summer, and the larger light roof or sunroof provided with a defroster in the winter.

The ability to change out the roof module in the adapter carrier in the present embodiment is also advantageous in cases where a damaged roof module is to be more quickly replaced with a new module at a lower cost instead of instituting more expensive repairs.

In another preferred embodiment, the central, open top area of the adapter carrier can be sealed by incorporating and properly securing a sheet metal roof.

As already discussed while addressing the interchangeability of individual roof modules, this embodiment also offers the advantage, for example, when purchasing a motor vehicle, to make do with a less expensive, conventional sheet metal roof incorporated in the adapter carrier provided on the motor vehicle, and later on upgrade the motor vehicle by replacing the simple sheet metal roof secured in the adapter carrier with a more expensive roof module.

Another advantage to being able to seal the adapter carrier in this embodiment by means of a sheet metal roof is that no decision needs to made during the manufacture of a vehicle type as to whether a motor vehicle body should be prepared for connection to an adapter carrier or just a simple sheet metal roof during the production process. The ability to optionally seal a motor vehicle body already equipped with an adapter carrier by means of a sheet metal roof in its roof area without any additional outlay or equip it with a roof module advantageously makes it possible to reduce the plurality of parts during the manufacture of the motor vehicle and its individual vehicle types (regardless of whether provided for a roof module or not), as well as to use a lower number of tools.

At least one object is further achieved by a method for manufacturing a motor vehicle body, which encompasses the step of joining a motor vehicle body with an adapter carrier according to the invention.

The adapter carrier can help stiffen the motor vehicle body in that an edge plate connects two parallel columns, when one of the edge plates to be arranged transverse to the longitudinal direction of the motor vehicle is initially connected with the respective structural component, after which the edge plates facing in the longitudinal direction of the motor vehicle are secured to the structural components facing in the longitudinal direction of the motor vehicle, and with an overlap on the edge sheet arranged transverse to the longitudinal direction of the motor vehicle. As a result, the edge plate situated transverse to the longitudinal direction of the motor vehicle is in direct contact with the motor vehicle body.

To further increase the stability of the motor vehicle body, it helps to overlap a second edge plate to be arranged transverse to the longitudinal direction of the motor vehicle and in the connection between opposing columns with the structural components facing in the longitudinal direction of the motor vehicle.

BRIEF DESCRIPTION OF THE DRAWINGS

The present invention will hereinafter be described in conjunction with the following drawing figures, wherein like numerals denote like elements, and FIG. 1 a simplified schematic view of a conventional sheet metal roof with a roof opening for accommodating a conventional roof module, perspective top view;

FIG. 3 a schematically simplified, perspective top view of the adapter carrier according to the invention as it is being attached to a motor vehicle body;

FIG. 5a a section through the adapter carrier according to the invention after installed along the line II-II shown on FIG. 2, again in schematically simplified form;

FIG. 6a a section through the adapter carrier according to the invention after installed along the III-III line shown on FIG. 2, in schematically simplified form.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
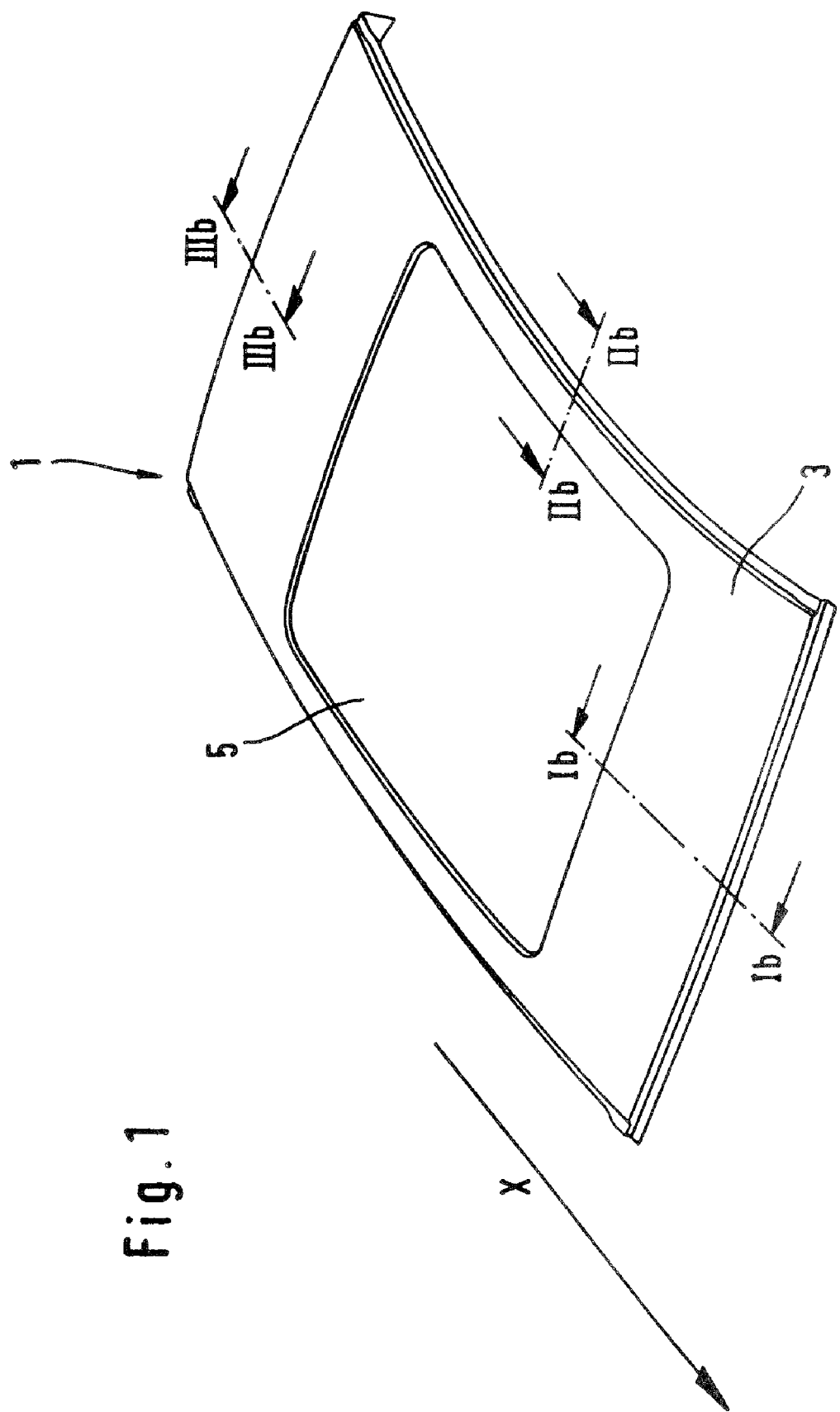

A conventional motor vehicle roof 1 shown on FIG. 1 exhibits a roof skin 3 and an opening 5 for a roof module. The longitudinal direction of the motor vehicle for the accompanying motor vehicle (the latter not shown in any greater detail) is labeled X. Three sections Ib-Ib, IIb-IIb and IIIb-IIIb on FIG. 1 are denoted by intersecting lines, wherein the arrows shown on the lines indicate the viewing direction on the respective sectional plane. The marked sections will be extensively discussed below in the following figures.

The motor vehicle roof 1 shown on FIG. 1 is in a state where the roof skin 3 already has a corresponding opening 5 for a roof module, but no roof module has yet been attached in the latter. As readily visible from FIG. 1, the roof skin 3 is a thin, conventional motor vehicle roof sheet, which in the exemplary embodiment depicted here is not reinforced in its central region by any additional supporting or roof structural elements.

Figure 2:
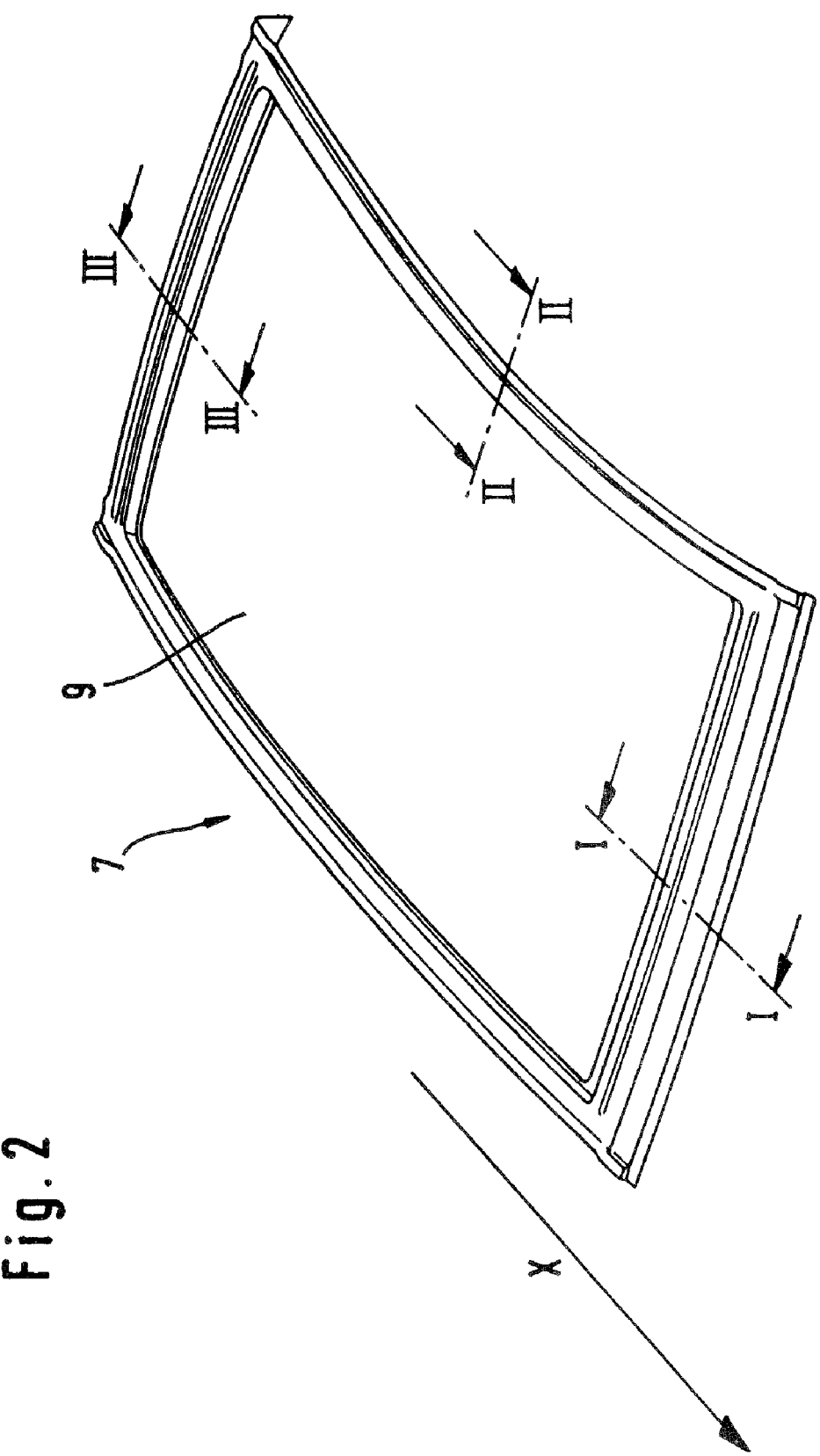
FIG. 2 an adapter carrier according to the invention in a schematically simplified, perspective top view.

The reference numbers on FIG. 2 already used on FIG. 1 denote the identical and/or identically acting components also marked with the same reference numbers on FIG. 1. In addition to FIG. 1 and FIG. 2, this also applies to the other figures; once specified, a reference number denotes the same respective component in all figures of this drawing.

FIG. 2 shows an exemplary embodiment of an adapter carrier 7 according to the invention with an opening 9 for a roof module in the central region of the adapter carrier 7. The adapter carrier 7 in the present embodiment is designed as a single frame element, which can be fit precisely onto a roof carrying frame structure (not shown in any greater detail here) of the corresponding motor vehicle (also not shown in any greater detail) so as to be welded with the latter.

Comparable to the procedure known from FIG. 1 above, FIG. 2 has three sections I-I, II-II and III-III with the viewing direction on the sectional plane respectively denoted by arrows; the sections will be explained in detail below in the following figures.

FIG. 3 schematically depicts the upper body section of a motor vehicle 11 at the moment an adapter carrier 7 is assembled and/or joined to a roof-carrying frame 13 readily visible on FIG. 3. The arrow M denotes that the adapter carrier 7 is placed on the roof-carrying frame 13 from the top down. After precisely fitting the adapter carrier 7, it can be welded with the roof-carrying frame 13, for example.

Figure 4A:
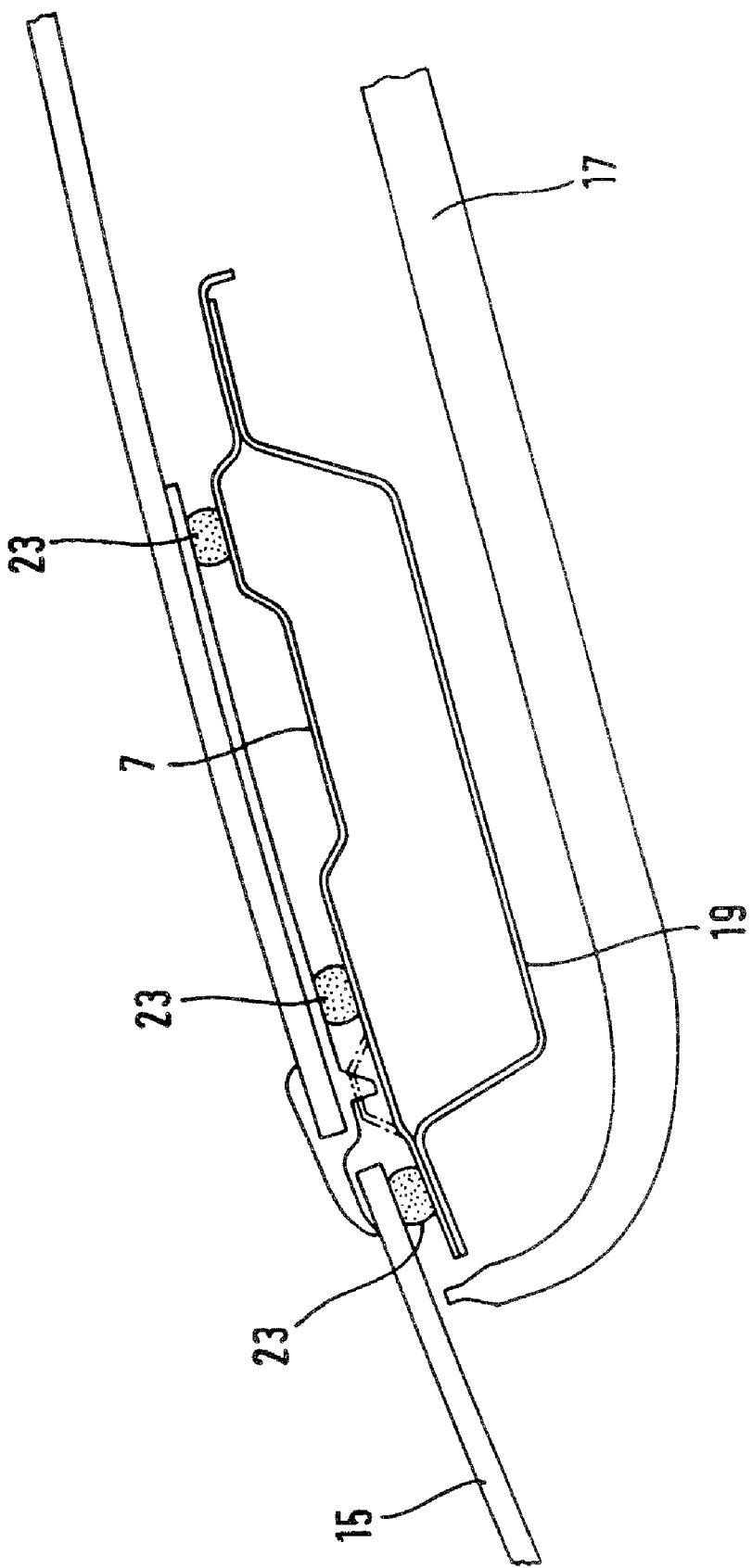
FIG. 4a a section through the adapter carrier according to the invention after installed along the I-I line shown on FIG. 2, in schematically simplified form.

FIG. 4*a* provides a schematically simplified view of the sectional plane of the section denoted along line I-I on FIG. 2 according to the arrows shown on FIG. 2. To better understand the depiction on FIG. 4*a*, it is recommended that FIG. 4*b* be consulted while examining FIG. 4*a*. FIG. 4*a* shows a section through the adapter carrier 7 according to the invention in the front area of the motor vehicle roof, a front protection disk 15, a cladding element 17, a roof structural element 19 as well as a glass roof or pane 21 inserted in the adapter carrier 7, along with bonding compounds 23, with which the glass roof 21 is bonded with the adapter carrier 7 or the adapter carrier 7 and/or the roof structural element 19 is bonded with the front protection disk 15.

Figure 4B:
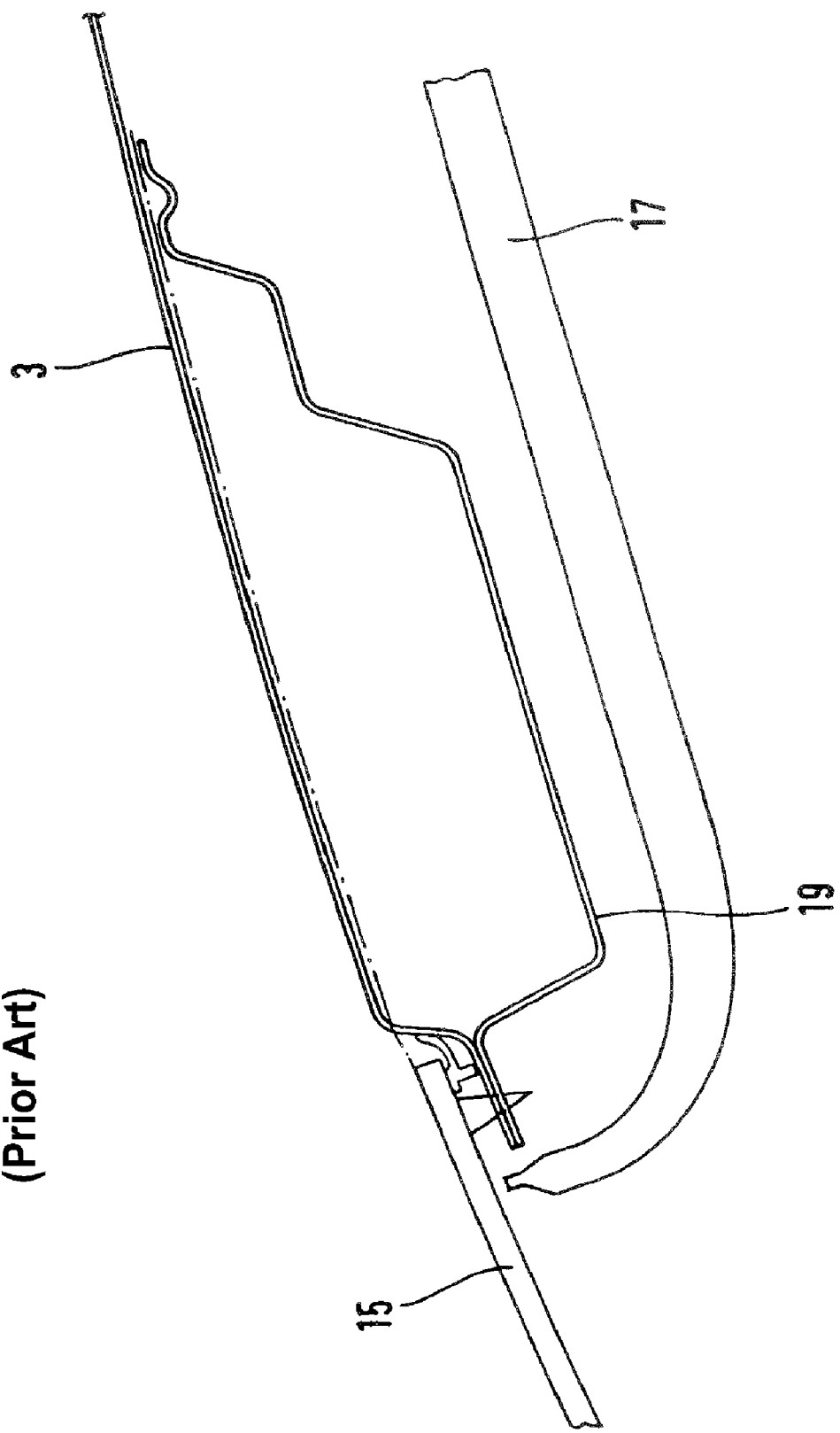
FIG. 4b a section through the conventional motor vehicle roof along the intersecting line Ib-Ib shown on FIG. 1, again in schematically simplified form.

By contrast, FIG. 4*b* depicts the conventional design of a motor vehicle with the roof skin 3 and without adapter carrier. As readily visible from a comparison between FIGS. 4*a* and 4*b*, the adapter carrier 7 on FIG. 4*a* is a one-piece adapter carrier 7 in this embodiment, based on the section shown on FIG. 4*a*.

Figure 5B:
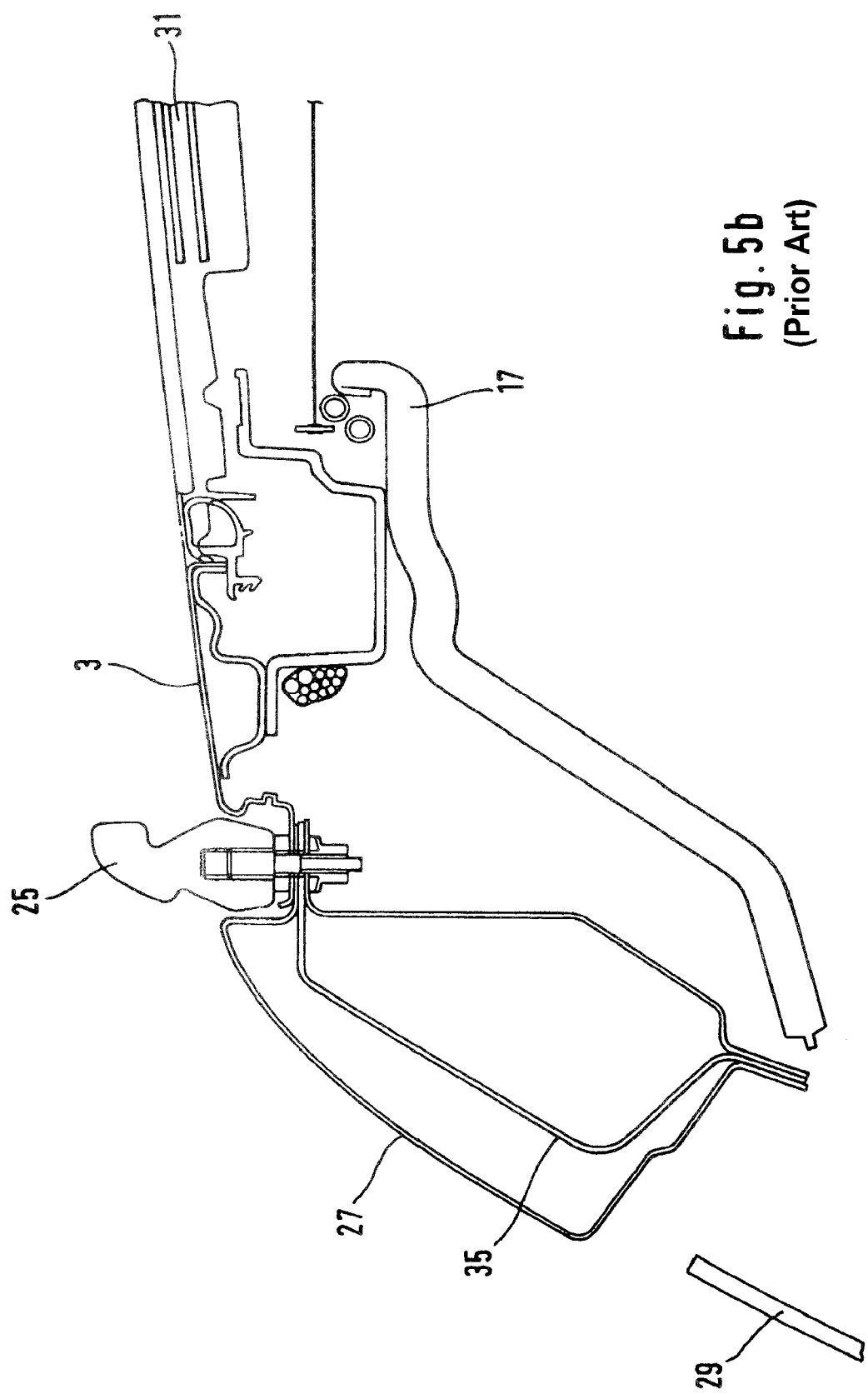
FIG. 5b a section through the conventional motor vehicle roof along the IIb-IIb line shown on FIG. 1, again in schematically simplified form.

FIG. 5*a* shows the schematically simplified sectional plane II-II from FIG. 2, while FIG. 5*b* shows the simplified sectional plane along the section IIb-IIb from FIG. 1. As was the case previously on FIGS. 4*a* and 4*b*, comparing FIG. 5*a* with FIG. 5*b* makes it easier to determine the design of the adapter carrier 7.

FIGS. 5*a* and 5*b* provide a view of a roof railing 25, a lateral vehicle skin 27 and a side window 29 in first section, which are not already known form the figures discussed above. FIG. 5*b* shows very clearly that an also depicted roof opening module 31 is supported against the roof skin 3; also visible is the significant installation depth required for the roof opening module 31, and the associated limitation on headroom for the driver and passengers.

By contrast, FIG. 5*a* shows a roof window 33, which is stable and not supported against the roof skin 3 (not shown on FIG. 5*a* and also not cut in the present section of the depicted embodiment), but rather against the more stable adapter carrier 7, which in turn is abutted against a lateral roof structural element 35 of the motor vehicle. The roof window 33 is in turn secured to the adapter carrier 7 by means of an adhesive compound 23 on FIG. 5*a*, in addition to which an alternative option for attaching the roof window 33 to the adapter carrier 7 via a screwed connection 37 is depicted in the embodiment shown.

Figure 6B:
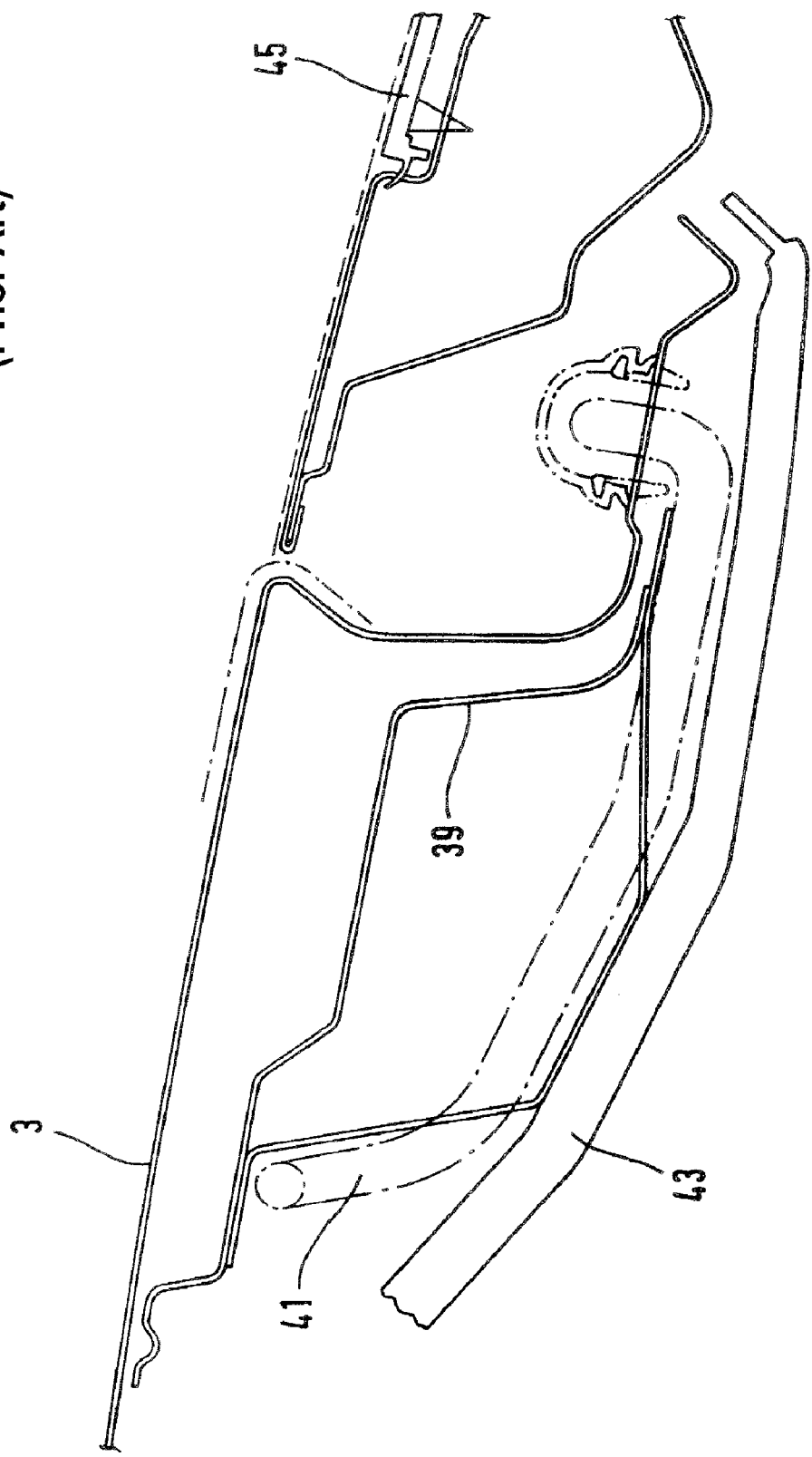
FIG. 6b a section through the conventional motor vehicle roof along the IIIb-IIIb line shown on FIG. 1, in schematically simplified form.

FIG. 6*a* provides a schematically simplified view of sectional plane III-III from FIG. 2, while FIG. 6*b* provides a simplified view of the sectional plane along section IIIb-IIIb from FIG. 1. As was already the case for FIGS. 4*a* and 4*b* as well as FIGS. 5*a* and 5*b*, comparing FIG. 6*a* with FIG. 6*b* makes is possible to more easily recognize the design of the adapter carrier 7.

FIGS. 6*a* and 6*b* in turn each depict a rear roof structural element 39 along with two cladding elements 41, 43. Further, both the conventional design on FIG. 6*b* and the embodiment according to the invention on FIG. 6*a* show a motor vehicle connection area 45 with the same structural design in both FIGS. 6*a* and 6*b*.

As can be readily seen especially on FIGS. 4*a*, 4*b*, 5*a*, 5*b*, 6*a* and 6*b*, and especially in a summary examination of respective FIG. 4*a*, 4*b* or 5*a*, 5*b* and 6*a*, 6*b*, an adapter carrier can be installed in an adapter carrier according to the invention in a conventional body with nearly no outlay required for this purpose. The embodiment depicted on the figures requires no special adjustment of the motor vehicle body for accommodating the adapter carrier. Only the roof skin supports shown in sections Ib-Ib and IIIb-IIIb should be shortened or cut accordingly, so that an adapter carrier according to the invention can be incorporated into the body as optimally as possible. However, this cutting or shortening process can be automated without any significant outlay. In addition, a simple structural redesign of the body makes it possible to omit even this step entirely. Therefore, the adapter carrier according to the invention can be mounting on top of a conventional motor vehicle body and secured thereto without any significant work-related or structural outlay, or even any costs of note.

Even the known and already proven installation sequences for brackets, handles, roof railing, head curtain incorporation, fenders front and back and the like can remain identical in comparison between conventional sheet roof and the use of an adapter carrier according to the invention.

As a result, the present invention is the first to propose a motor vehicle body with a roof-carrying frame, upon which an adapter carrier for holding roof windows, sliding roofs, roof opening systems and/or roof module variants is mounted and secured, and an adapter carrier suitable for installation in a motor vehicle body according to the invention. Further, the invention specifies a corresponding manufacturing method.

Figure 7:
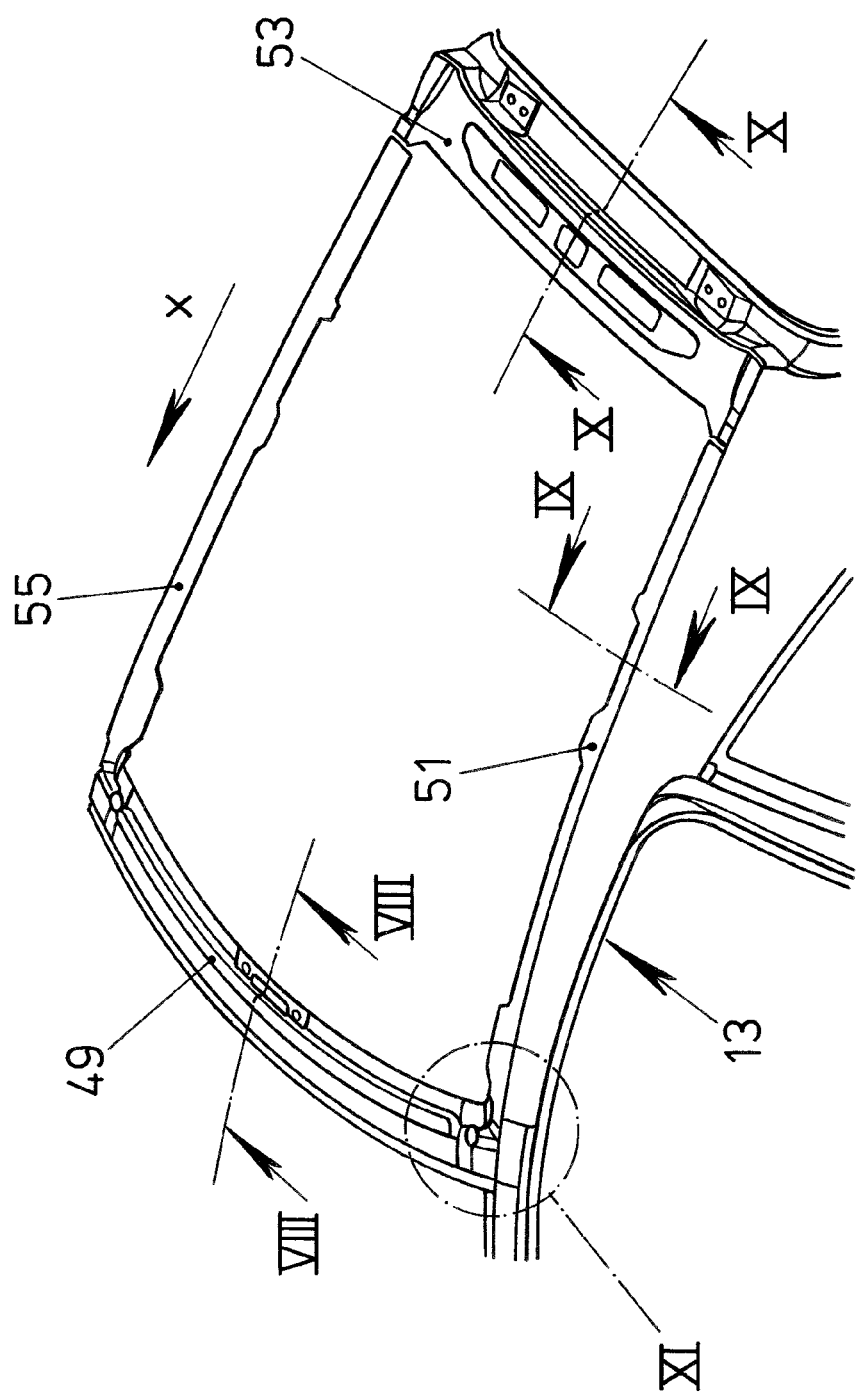
FIG. 7 another embodiment of the motor vehicle body with an adapter carrier composed of edge plates.

FIG. 7 shows another embodiment of the motor vehicle body with an adapter carrier 47 secured to the roof-carrying frame 13. As opposed to the adapter carrier 7 on the preceding figures, the adapter carrier 47 depicted on FIG. 7 and the following figures is composed of four individual edge plates 49, 51, 53 and 55.

Figure 8:
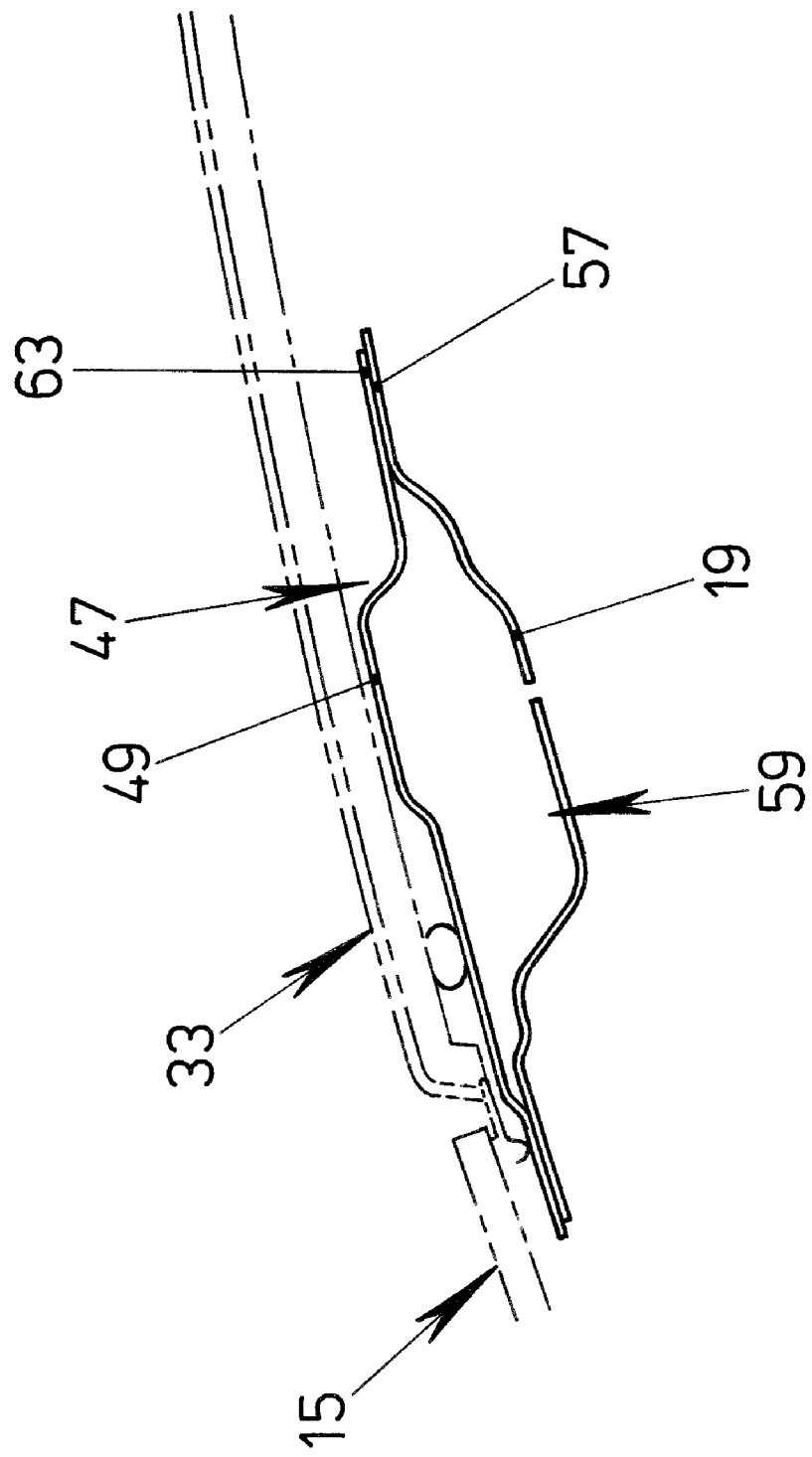
FIG. 8 a sectional view through the motor vehicle body along the VIII-VIII line from FIG. 7.

FIG. 8 shows a sectional view along the VIII-VIII line of the adapter carrier 47 from FIG. 7, with bordering areas of the motor vehicle body. This sectional view corresponds to the section from FIG. 4a of the first embodiment. As can be seen, the edge plate 49 of the adapter carrier 47 is secured directly to a bearing flange 57 of the structural element 19 by means of a flange 63, and forms a hollow chamber 59 with the structural element 19.

Figure 9:
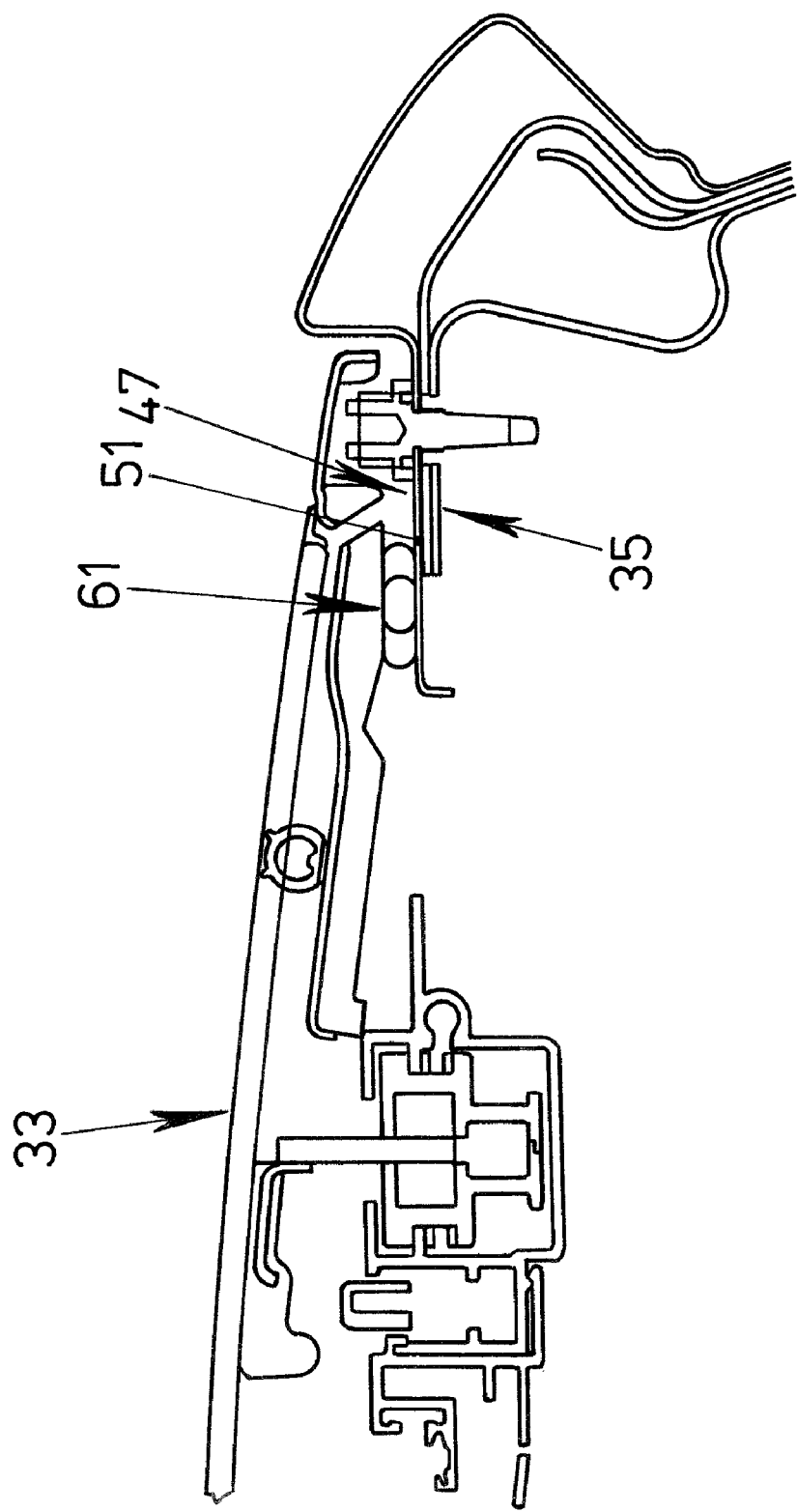
FIG. 9 a sectional view through the motor vehicle body along the IX-IX line from FIG. 7.

FIG. 9 shows a sectional view along the IV-IV line through the adapter carrier 47 from FIG. 7 of the attachment of an edge plate 51 facing in the longitudinal direction of the motor vehicle to the corresponding structural element 35. As in the embodiment shown on FIG. 5a, the roof window 33 lies on an adhesive compound 61 arranged on the adapter carrier 47.

Figure 10:
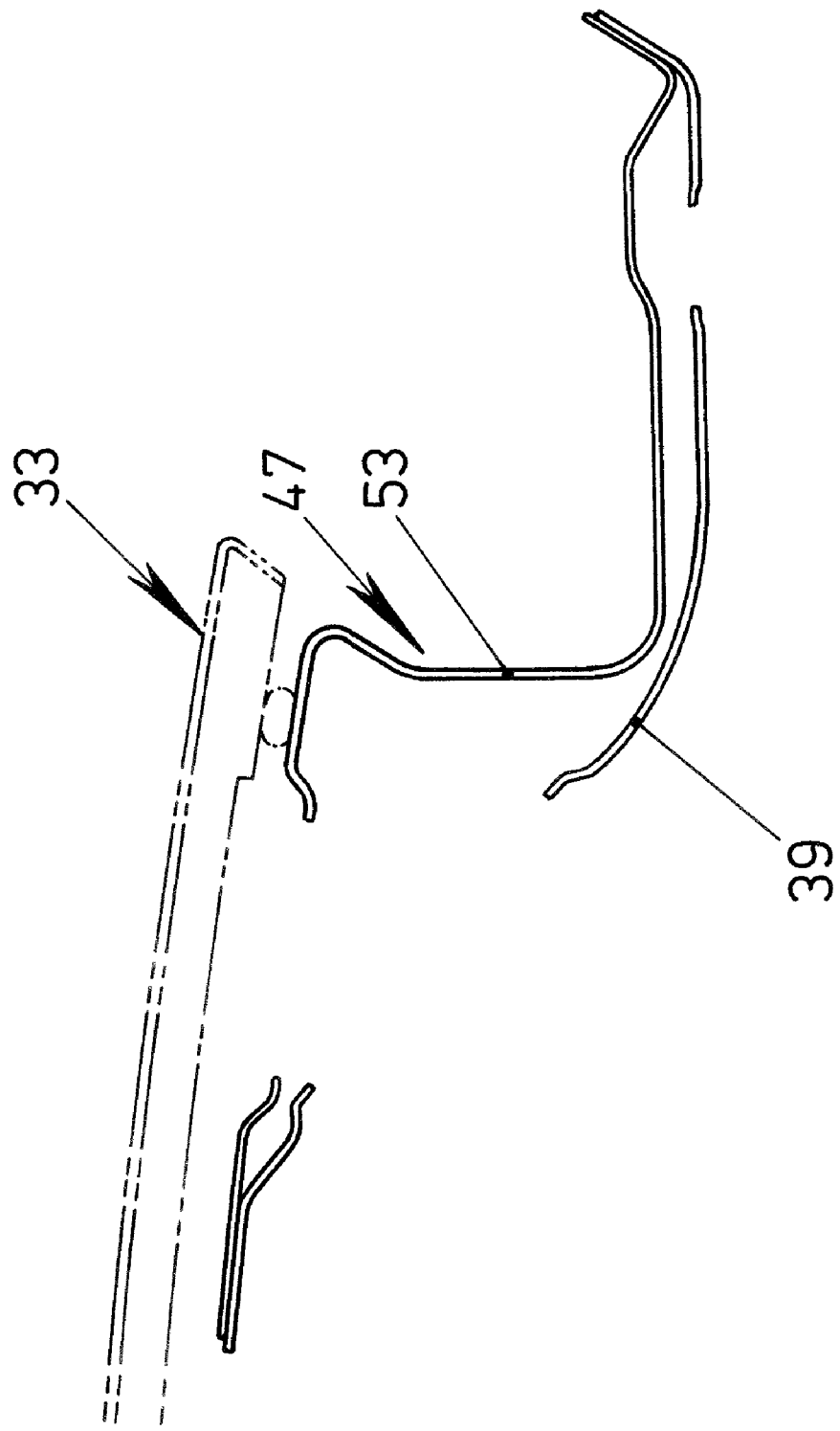
FIG. 10 a sectional view through the motor vehicle body along the X-X line from FIG. 7.

FIG. 10 shows a sectional view along the X-X line through the adapter carrier 47 from FIG. 7 of the attachment of one of the edge plates 53 to the corresponding roof structural element 39. This sectional view corresponds to the one on FIG. 6a depicting the first embodiment. The roof window 33 here also lies on the adhesive compound 761.

Figure 11:
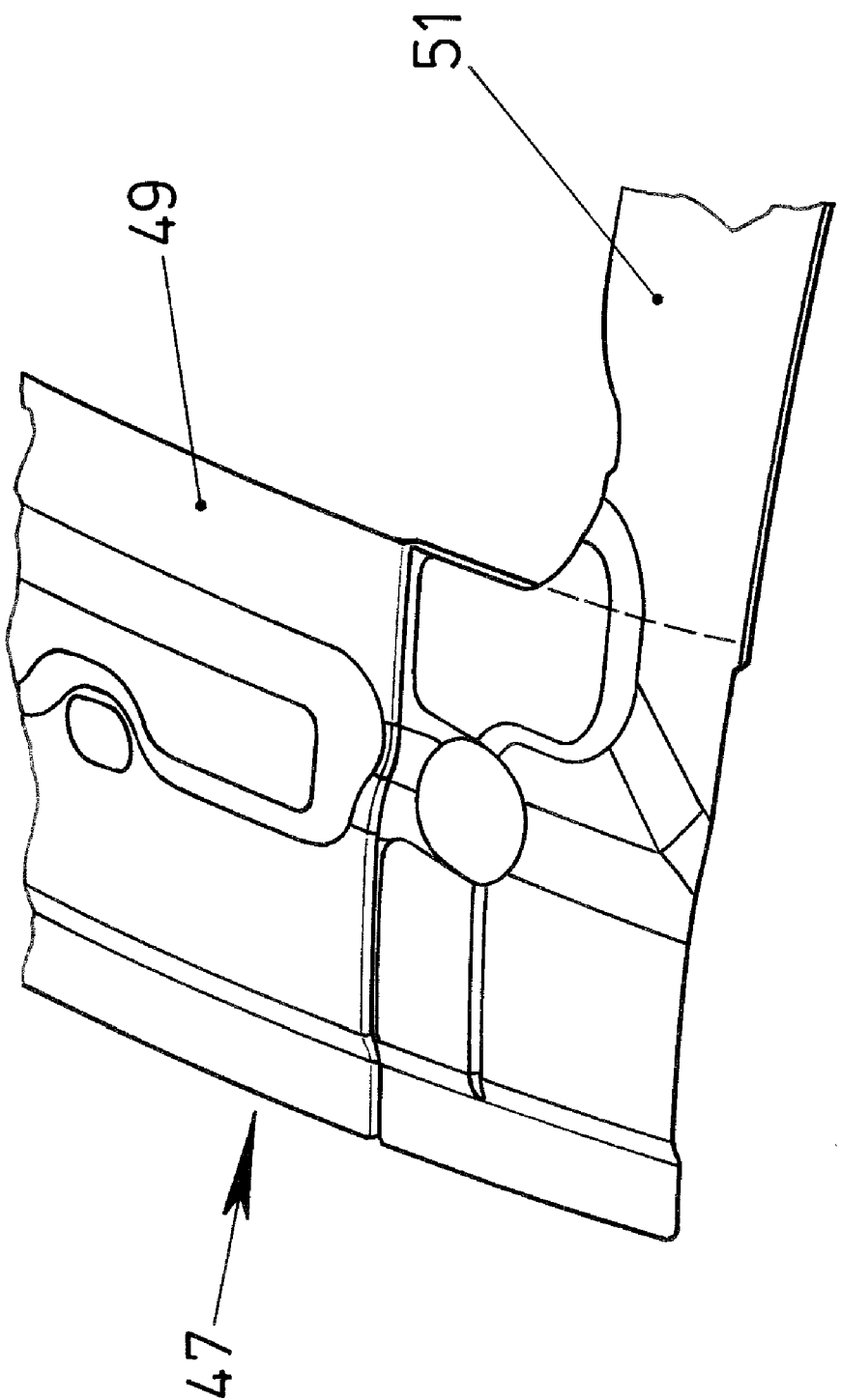
FIG. 11 a highly magnified view of an overlapping area of two edge plates of the adapter carrier from FIG. 7.

FIG. 11 shows a highly magnified view of the attachment of two abutting edge plates 47, 51 of the adapter carrier 47 from FIG. 7. As can be seen, the edge plate 51 facing in the traveling direction overlaps the edge plate 49 facing transverse to the longitudinal direction of the motor vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A motor vehicle body comprising:
at least two pairs of columns, which are interconnected to form a roof-carrying frame by two structural components extending in the longitudinal direction of the motor vehicle as well as two structural components extending in the transverse direction of the motor vehicle, the two structural components extending in the transverse direction including a front transverse structural component and a rear transverse structural component, and each of the two structural components extending in the longitudinal direction comprising lateral skins that form a hollow space, and a lateral roof structural element between the lateral skins and residing in the hollow space;
a single-piece adapter carrier formed from a weldable material and welded to the roof-carrying frame and secured thereto, in order to accommodate roof windows, sliding roofs, roof opening systems and/or roof module variants in the adapter carrier, wherein a front section of the adapter carrier is coupled to the front transverse structural component and resides above the front transverse structural component, a rear section of the adapter carrier is coupled to the rear transverse structural component and resides above the rear transverse structural component, the front transverse structural component and the front section of the adapter carrier together define and border a first hollow chamber therebetween, and the rear transverse structural component and the rear section of the adapter carrier together define and border a second hollow chamber therebetween, and wherein a first side section of the adapter carrier is coupled to a first one of the two structural components extending in the longitudinal direction and resides above the lateral skins and above the lateral roof structural element of the first structural component extending in the longitudinal direction, a second side section of the adapter carrier is coupled to a second one of the two structural components extending in the longitudinal direction and resides above the lateral skins and above the lateral roof structural element of the second structural component extending in the longitudinal direction, and wherein the first and second side sections of the adapter carrier extend in the transverse direction and away from the two structural components extending in the longitudinal direction; and
a roof element coupled to and overlying the adapter carrier, wherein a front section of the roof element overlies the front transverse structural component, overlies the front section of the adapter carrier, and overlies the first hollow chamber, wherein a rear section of the roof element overlies the rear transverse structural component, overlies the rear section of the adapter carrier, and overlies the second hollow chamber, wherein a first side section of the roof element overlies the first side section of the adapter carrier, and wherein a second side section of the roof element overlies the second side section of the adapter carrier.

2. The motor vehicle body according to claim 1, wherein the adapter carrier interconnects several columns.

3. The motor vehicle body according to claim 1, wherein the adapter carrier is essentially designed as a frame structure.

4. The motor vehicle body according to claim 1, wherein the adapter carrier exhibits attachment devices for roof opening systems whose design makes it possible to change out the respective roof opening system for another roof opening system.

5. The motor vehicle body according to claim 1, wherein its central, open top area can be sealed by incorporating and securing a sheet metal roof.

6. The motor vehicle body according to claim 1, wherein:
the roof element has a lowermost surface; and
no portion of the adapter carrier resides above the lowermost surface of the roof element.

7. A motor vehicle body comprising:
a roof-carrying frame comprising:
a first longitudinal structural component extending in the longitudinal direction of the motor vehicle, and comprising first lateral skins that form a first hollow space and a first lateral roof structural element coupled between the first lateral skins and residing in the first hollow space;

a second longitudinal structural component extending in the longitudinal direction of the motor vehicle, and comprising lateral skins that form a second hollow space and a second lateral roof structural element coupled between the second lateral skins and residing in the second hollow space;

a front transverse structural component extending in the transverse direction of the motor vehicle;

a rear transverse structural component extending in the transverse direction of the motor vehicle;

a single-piece adapter carrier formed from a weldable material and welded to the roof-carrying frame, in order to accommodate roof windows, sliding roofs, roof opening systems and/or roof module variants in the adapter carrier, the adapter carrier comprising:

a first side section coupled to the first longitudinal structural component, the first side section residing above the first lateral skins and above the first lateral roof structural element, and the first side section extending away from the first longitudinal structural component in the transverse direction of the motor vehicle;

a second side section coupled to the second longitudinal structural component, the second side section residing above the second lateral skins and above the second lateral roof structural element, and the second side section extending away from the second longitudinal structural component in the transverse direction of the motor vehicle;

a front section coupled to the front transverse structural component, the front section residing above the front transverse structural component, wherein the front section and the front transverse structural component together define and border a first hollow chamber therebetween;

a rear section coupled to the rear transverse structural component, the rear section residing above the rear transverse structural component, wherein the rear section and the rear transverse structural component together define and border a second hollow chamber therebetween; and a roof element coupled to and overlying the adapter carrier, the roof element comprising:

a lowermost surface, wherein no portion of the adapter carrier resides above the lowermost surface of the roof element;

a first side portion overlying the first side section of the adapter carrier, wherein no portion of the first side portion resides above the first longitudinal structural component of the roof-carrying frame;

a second side portion overlying the second side section of the adapter carrier, wherein no portion of the second side portion resides above the second longitudinal structural component of the roof-carrying frame;

a front portion overlying the front transverse structural component, overlying the front section of the adapter carrier, and overlying the first hollow chamber; and a rear portion overlying the rear transverse structural component, overlying the rear section of the adapter carrier, and overlying the second hollow chamber.

* * * * *